United States Patent Office 3,227,685
Patented Jan. 4, 1966

3,227,685
POLYMERIC PHOSPHONAMIDES
Morris L. Nielsen and George F. Deebel, Dayton, Ohio, assignors, by direct and mesne assignments, to Monsanto Research Corporation, a corporation of Delaware
No Drawing. Filed Nov. 21, 1962, Ser. No. 240,197
4 Claims. (Cl. 260—47)

This invention relates to polymeric organophosphorus compounds and to methods of preparing the same, and more particularly provides new and valuable polymeric phosphonamides.

According to the invention there are prepared high molecular weight polymers by reaction of an organodihalophosphorus compound with certain amino ethers, substantially according to the scheme:

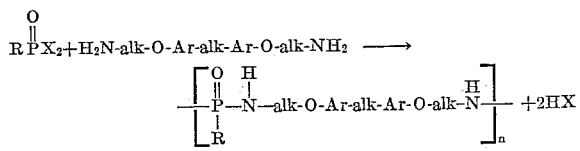

in which R and Ar are aromatic hydrocarbon free of olefinic and acetylenic unsaturation and containing from 6 to 2 carbon atoms, alk is alkylene of from 1 to 5 carbon atoms, X is halogen and $n$ denotes the degree of polymerization. Generall, $n$ will be from 100 to 1000.

The presently useful organodihalophosphorus compound may be any aromatic hydrocarbonphosphonic acid dichloride, dibromide or diiodide wherein the hydrocarbon is free of aliphatic and acetylenic unsaturation, e.g., phenylphosphonic dichloride or dibromide, 2-, 3- or 4-tolylphosphonic dichloride or diiodide, 2-, 3- or 4-n-hexylphenylphosphonic dibromide or dichloride, pentamethylphenylphosphonic dichloride or diiodide, α- or β-naphthylphosphonic dichloride or dibromide, 2-, 3- or 4-biphenylylphosphonic dibromide or dichloride, 2-, 3- or 4-benzylphenylphosphonic dichloride or diiodide, 2-, 3- or 4-cyclopentylphenylphosphonic dibromide or dichloride, 1- or 5-acenaphthenylphosphonic dichloride or dibromide, etc.

The amino ethers which are reacted with the hydrocarbonphosphonic acid dihalides are bis[4-(3-aminoalkoxy)aryl]alkanes having from 1 to 5 carbon atoms in the alkoxy, from 6 to 9 carbon atoms in the aryl, and from 1 to 6 carbon atoms in the alkane. Examples of the presently useful amino ethers are:

2,2-bis[4-(3-aminopropoxy)phenyl]propane
2,2-bis[4-(2-aminoethoxy)phenyl]propane
Bis[4-(4-aminobutoxy)phenyl]methane
1,2-bis[4-(3-aminopropoxy)phenyl]ethane
1,3-bis[4-(aminomethoxy)phenyl]propane
1,4-bis[4-(5-aminopentoxy)-3-ethylphenyl]butane
1,5-bis[4-(2-aminoethoxy)phenyl]pentane
2,2-bis[3-(3-aminopropoxy)-α-naphthyl]propane
2,2-bis[4-(2-aminoethoxy)-p-biphenylyl]propane
3,3-bis[3-aminobutoxy)-2-hexylphenyl]pentane
2,2-bis[4-(3-aminopropoxy)tetramethylphenyl]propane
1,3-bis[4-(2-aminoethoxy)-2-methylphenyl]propane Owing to easy availability, the aminoalkyl ethers of alkylidene diphenols, e.g., of 4,4'-isopropylidenediphenol, 4,4'-isopropylidenebis(2-ethylphenol), 4,4'-butylidenediphenol, 2,2' - neopentylidenebis[4 - tert - butyl - 6 - isopropylphenol), 4,4'-(1-methylbutylidene)dihpenol, are particularly useful. Such alkylidenediphenols are generally prepared by the reaction of a carbonyl compound, e.g., a saturated aliphatic ketone, with a phenol. The aminoalkyl ethers of the alkylidenediphenols are prepared by addition of an alkenenitrile, e.g., acrylonitrile, to the diphenol to give the bis[(cyanoalkoxy)aryl]alkane, as disclosed in the chapter on cyanoethylation which appears in "Organic Reactions," edited by Roger Adams et al., John Wiley and Sons, N.Y., 1949, volume 5, pp. 79–135, especially at p. 89. Hydrogenation of the latter, e.g., in presence of Raney nickel, to reduce the cyano group to the amine in order to give the bis[(aminoalkoxy)aryl]alkane.

Reaction of the hydrocarbonphosphonic dihalide with the bis[(aminoalkoxy)aryl]alkane to give the presently provided polymeric phosphoramides may be conducted by simply mixing the two reactants in the presence of a basic agent and allowing the mixture to stand until polymerization is completed. The reaction is usually exothermic; hence, heating is not generally required. However, when working with the somewhat sluggish higher hydrocarbonphosphonic dihalides, e.g., the biphenylphosphonic dichlorides or the dipentylphenylphosphonic dibromides, or with the higher bis[(aminoalkoxy)aryl]alkanes such as the bis[(aminoalkoxy)biphenylyl]alkanes or bis[(aminoalkoxy)phenyl]alkanes wherein the phenyl radical is substituted by alkyl or wherein the alkoxy and/or the alkane group has more than, say, 3 carbon atoms, or wherein alkane has no branching, heating may be used for the purpose of decreasing reaction time. Temperatures of from, say, 60° C. to 150° C., are thus useful.

Advantageously, the reaction is conducted in the presence of an inert liquid diluent or solvent, and when such diluent or solvent is employed and the reaction appears to be sluggish, operation at the refluxing temperature of the reaction mixture, at least toward the end of the reaction, is a convenient means of assuring completion of the reaction within an economically feasible length of time. Examples of suitable diluents are chloroform, dioxane, benzene, xylene, acetone, carbon tetrachloride, dimethylformamide, N,N-dimethylacetamide, dimethyl sulfoxide, etc.

The basic agent, which serves not only to catalyze the reaction but may also serve as hydrogen halide scavenger, may be organic or inorganic, e.g., an alkali metal hydroxide or basic salt thereof such a sodium, potassium, lithium or rubidium hydroxide, carbonate or acetate; an alkali metal alkoxide such as sodium or potassium methoxide or proproxide; a tertiary alkylamine such as trimethylamine or tributylamine; a heterocyclic nitrogen base such as N-methylmorpholine or pyridine; a quaternary ammonium compound such as benzyltrimethylammonium methoxide or tetrabutylammonium butoxide, etc.

Since reaction occurs with evolution of hydrogen halide, it is advisable to make provision for removal of the halide as it is formed, e.g., by means of vigorous stirring and/or dephlegmation and/or by employing the basic material in an amount sufficient to serve as a hydrogen scavenger, whereby the hydrogen halide which is formed is removed from the reaction zone as the halide of the base.

All of the reaction variables, i.e., nature of diluent, basic agent, temperature, pressure, etc., can be arrived at readily by easy experimentation. Since reaction is evidenced by change in viscosity and evolution of hydrogen halide, progress of the reaction can be followed by noting these.

Two moles of the bis[(amminoalkoxy)aryl]alkane react with one mole of the hydrocarbonphosphonic dihalide to yield the present polymers; hence the two reactants are advantageously employed in such stoichiometric proportions. However, an excess of either reactant may be employed, although the average molecular weight of the polymer product generally will be lower than when stoichiometric amounts are used. There may be used a mixture of two or more hydrocarbonphosphonic dihalides, e.g., a mixture of p-tolylphosphonic dichloride and β-naphthylphosphonic dibromide and there may be used a mixture of two or more bis[(aminoalkoxy)aryl] alkanes, e.g., a mixture of 2,2-bis[4-(3-aminopropoxy)-3-ethylphenyl]propane and 3,3-bis[4-(3-aminopropoxy) phenyl]pentane to obtain polymers having various linkages dispersed more or less randomly in the polymer chain.

The presently provided polymeric aryloxyalkyl amides of aromatic hydrocarbon phosphonic acids range from waxy to high-melting solids. Of particular importance are those of the polymers which are solid, resinous materials. Such products are useful as impregnating agents and adhesives for laminates, and as the resinous base of oil vehicle coatings. They can be spun into fibers from solutions or the molten polymers may be cast or extruded through suitable orifices.

The invention is further illustrated by, but not limited to, the following example.

*Example*

To a mixture of 75 ml. of water, 7.34 g. sodium hydroxide and 35.93 g. of 2,2-bis[4-(3-aminopropoxy) phenyl]propane there was added dropwise, during a period of 15 minutes, a solution of 17.9 g. of phenylphosphonic dichloride in 115 ml. of chloroform while maintaining the temperature of the reaction mixture at 0° C. to 7° C. The whole was then stirred for 2 hours at this temperature, and then allowed to stratify. The resulting chloroform layer was separated. Upon addition of hexane therto the polymeric product was precipitated. It was filtered off and dried under vacuum at about 75° C., to give an 83% theoretical yield of the solid, polymeric phosphoramide, having a decomposition point of about 300° C., analyzing 5.35% N and 5.66% P as compared to 5.78% and 6.39%, the responsive calculated values, and consisting essentially of the repeating unit.

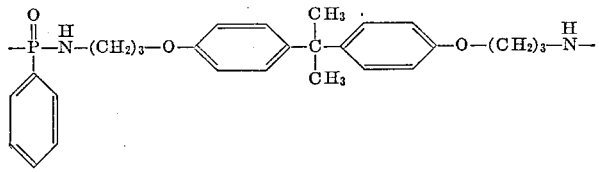

Nuclear magnetic resonance study of the polymer showed a single peak for $P^{31}$ at $-23.4$ p.p.m. in methanol, which is characteristic of

The molten polymer could be drawn into fibers and cast to give smooth, well-defined, molded objects.

We claim:
1. A polymeric phosphonamide consisting essentially of the repeating unit

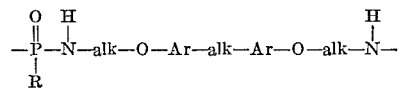

in which R and Ar are aromatic hydrocarbon free of olefinic and acetylenic unsaturation and containing from 6 to 12 carbon atoms, and alk is alkylene of from 1 to 5 carbon atoms.

2. The polymeric phosphonamide defined in claim 1, further limited in that Ar is phenylene.

3. The polymeric phosphonamide defined in claim 1, further limited in that alk has 3 carbon atoms.

4. A polymeric phosphonamide consisting essentially of the repeating unit

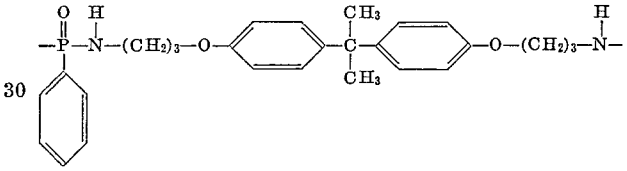

References Cited by the Examiner

UNITED STATES PATENTS 3,148,215  8/1964  Holsten _____ 260—570

FOREIGN PATENTS 1,243,608  9/1960  France.

WILLIAM H. SHORT, *Primary Examiner.*

UNITED STATES PATENT OFFICE
CERTIFICATE OF CORRECTION

Patent No. 3,227,685　　　　　　　　　　　　January 4, 1966

Morris L. Nielsen et al.

It is hereby certified that error appears in the above numbered patent requiring correction and that the said Letters Patent should read as corrected below.

Column 1, line 28, for "Generall" read -- Generally --; line 58, for "3,3-bis[3-aminobutoxy)-2-hexylphenyl]pentane" read -- 3,3-bis[4-(3-aminobutoxy)-2-hexylphenyl]pentane --; column 2, line 40, for "a" read -- as --; line 62, for "amminoalkoxy" read -- aminoalkoxy --; column 3, line 34, for "responsive" read -- respective --.

Signed and sealed this 5th day of September 1967.

(SEAL)
Attest:

ERNEST W. SWIDER
Attesting Officer

EDWARD J. BRENNER
Commissioner of Patents